United States Patent [19]

Fergg

[11] Patent Number: 4,591,263
[45] Date of Patent: May 27, 1986

[54] PHOTOGRAPHIC ROLLER COPYING DEVICE

[75] Inventor: Berthold Fergg, Taufkirchen, Fed. Rep. of Germany

[73] Assignee: Agfa-Gevaert Aktiengesellschaft, Leverkusen, Fed. Rep. of Germany

[21] Appl. No.: 713,270

[22] Filed: Mar. 18, 1985

[30] Foreign Application Priority Data

Apr. 4, 1984 [DE] Fed. Rep. of Germany ....... 3412693

[51] Int. Cl.⁴ .................. G03B 27/52; G03B 27/70
[52] U.S. Cl. ................................ 355/43; 355/66
[58] Field of Search ............... 355/43, 46, 60, 66

[56] References Cited

U.S. PATENT DOCUMENTS

| | | | |
|---|---|---|---|
| 2,257,551 | 9/1941 | Griffin et al. | 355/43 |
| 3,323,414 | 6/1967 | Ritchie et al. | 355/43 |
| 3,574,459 | 4/1971 | Hartwig et al. | 355/66 |
| 3,649,119 | 3/1972 | Rempala et al. | 355/45 |
| 3,689,149 | 9/1972 | Livingood | 355/46 |
| 3,802,773 | 4/1974 | Schneider | 355/43 |

Primary Examiner—Monroe H. Hayes
Attorney, Agent, or Firm—Michael J. Striker

[57] ABSTRACT

A photographic roller copying device for projecting of originals of different side lengths onto a band-shaped copying material with a band width corresponding to the desired copy size and originals arranged in a band form and having different formats located along and transverse to the longitudinal direction of the band, has a projecting objective with adjustable projecting scale allowing a copy size of both original formats, and a turning prism turnable between a first angular position which turns the image of the original by 90° and a second angular position which turns the image of the original by 0° or 180°.

7 Claims, 2 Drawing Figures

PHOTOGRAPHIC ROLLER COPYING DEVICE

BACKGROUND OF THE INVENTION

The present invention relates to a photographic roller copying device for projecting of originals having different side lengths onto a band-shaped copying material.

The use of cameras with the so-called half-format 18×24 mm on so-called small photofilms and with organizational changes in copying laboratories by gluing together of undeveloped films to long bands, the problem has arisen that a film band composed of many films often contains films of different original sizes. The German Patent No. 1,953,015 describes a roller copying device which is provided, for copying of an original roll with a film of different original formats and allows an automatic control of the image aperture to the respective original size in correspondence with the marking at the film edge or at the initial portion of the film. The procedure described in this patent has however the result that with constantly retained projection scale of the so-called half-format originals with the dimensions 18×24 mm, only half size copies are provided as of the small photo originals with dimensions 24×36 mm. These results are, however, not satisfactory for the photographers.

SUMMARY OF THE INVENTION

Accordingly, it is an object of the present invention to provide a roller copying device which avoids the disadvantages of the prior art.

More particularly, it is an object of the present invention to provide a photographic roller copying device which can make from originals of different sizes copies of the same size corresponding to the width of the copying material band.

In keeping with these objects and with others which will become apparent hereinafter, one feature of the present invention resides, briefly stated, in a photographic copying device which has a projecting objective with adjustable projecting scale making possible from different original formats a uniform copy size, and a turning prism located in a beam course and turnable between a first angular position in which it turns the image of the original by 90° and a second angular position in which turns the image of the original by 0° or 180°.

Taking into consideration the difficulties that normally the projection of one original type is turned by 90° for projecting copies of the same diameter lying one after the other of both original types on the copying material, the problem takes place that during arrangement of a turning prism in the beam course for only one original type, the adjusting of the objective for the other original type because of the changed light path in the turning prism is no longer determined. The way proposed by the invention allows the turning prism for both original types in the beam course and operates so that by the respective change of the angular position of this prism for both original types correctly located copies are projected onto the paper band. Different prisms arranged at different points of the beam course can be used in accordance with the invention.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
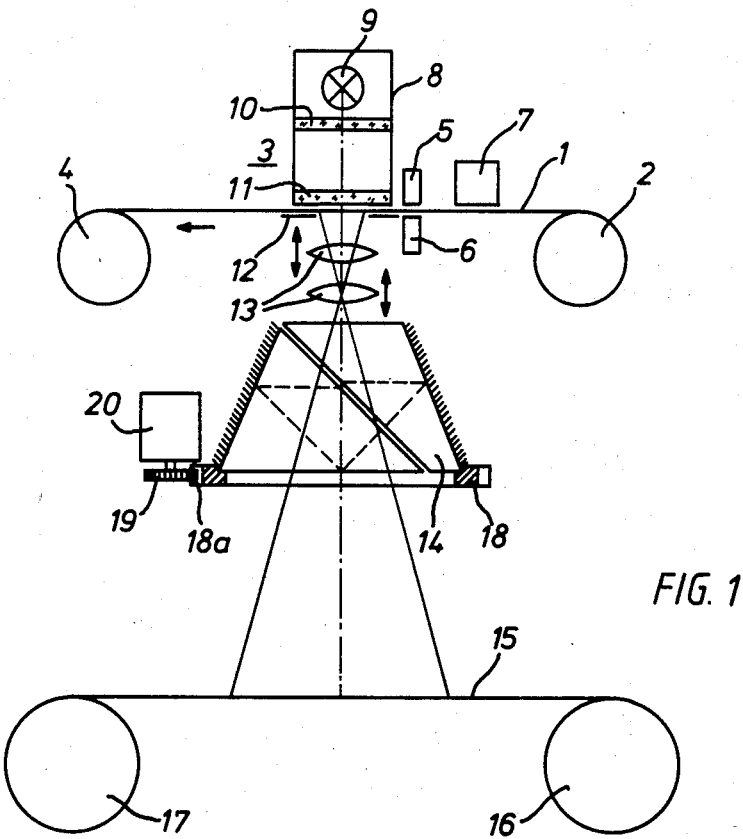
FIG. 1 is a view showing a photographic roller copying device in accordance with the present invention, with a projection system having a turning prism.

A band of originals to be copied glued together from a greater number of films with different original formats is identified in FIG. 1 with reference numeral 1. The band is transported from unwinding spool 2 to a winding-on spool 4 through a copying station 3. A sensing device including a light source 5 and a light receiver 6 is arranged along the film path. It senses the presence of marks on the film edge which are associated in correspondence with the position of the originals to be copied. The not shown film transporting device is so controlled by the sensing device 5, 6 that the original which belongs to a fixed mark is transported for so many steps or over such a length that it comes to a standpoint in the copying window.

A further sensing device 7 is arranged before the copying station 3 and detects the respective format size in a film in accordance with its preceding gluing point. In connection with this, either a format code can be tested at the the gluing point, or if it is not available, the respective original format can be detected in accordance with the German Patent No. 1,953,015 by evaluation of the distance between successive marks.

A lamp structure 8 is located above an original in the copying station 3. It includes a light source 9, a diffusing lens 10 arranged at an inlet side, and a diffusing lens 11 arranged at an outlet side. The light coming from the lamp 9 is mixed after coloring with a suitable not shown color filter, through the diffusing lens 10 and a following inwardly reflecting shaft 8 so that a homogeneous light stream passes from the diffusing lens 11 to the original.

An arrangement for adjusting an illumination window in a film support 12 is shown schematically. It is adjustable to the respective original length in the film transporting direction. This adjustment is performed, for example, by an electro-motoric drive in correspondence with a signal from the sensing device 7.

An objective 13 is located under the image aperture and is suitable for changing by motor-operated relatively displaceable members, of the distance between the back lens and image or in other words for changing the projection scale of the original 1. The objective can be formed as disclosed in the German patent application No. P 3,339,960. In a beam course behind the objective a prism 14 is arranged which performs for originals of the half-format a rotation of the image by 90°. The prism as shown in FIG. 1 is a prism in accordance with Schmidt-Pechan, a penta prism with half root. It is reflectable on the right lateral face and on the left lateral face in the drawing and has a gluing surface between the penta prism and the half root. A parallel beam passing from above into the prism is deflected first on the gluing surface to the right mirror surface, then is deflected from the latter, then is reflected normally to the gluing surface to the lower outlet surface reflecting at this angle of incidence, and then passed to the left lateral surface and finally through the gluing surface normally to the outlet surface downwardly to a copying material band 15. The copying material band 15 is transported from an unwinding spool 16 to a winding-on spool 17.

The prism 14 is mounted on a rotary plate 18 which is in engagement via a toothing 18a with a pinion 19. The pinion 19 is driven by a motor 20. The axis of the rotary plate 18 corresponds to the axis of the objective 13.

In the shown position, the plane in which the parallel beams are deflected inside the prism 14 is parallel to the film transporting direction and to the charging plane. When the prism 14 is turned about the optical axis, the image will be turned by a doubled angle as compared with the turning of the prism. For projecting the original turned by 90° on the paper band 15, it is therefore only required to turn the prism 14 by 45° in its plane.

The inventive photographic roller copying device operates in the following manner:

When the sensing device 7 determines a film with originals of the format 24×36 mm or in other words with a greater size in the longitudinal direction of the band, the masks on the film support 12 will extend from one another, the projection scale of the objective 13 will be adjusted to a smaller value and the prism 14 Will be brought by the motor 20 in the non-turning position. If with a further film it is determined on the gluing point or on the masks by the sensing device 7 that smaller originals located transverse to the direction of elongation of the band are provided, the masks will be moved to a smaller distance the objective 13 will be adjusted to a greater projection scale, and the prism 14 will be rotated by the motor 20 by 45°. Thereby, regardless of the original format, copies of the same size with a greater dimension in the longitudinal direction of the paper are provided on the paper band 15 and fill the paper band in its width.

The inventive construction can also be used when paper band 15 is wider and so wide that the desired copy length corresponds to the width of the paper. Then the prism 14 for the originals lying in the longitudinal direction of the film having a format 24×36 mm is brought to the rotating position and for the so-called half format originals to the non-rotating position.

Figure 2:
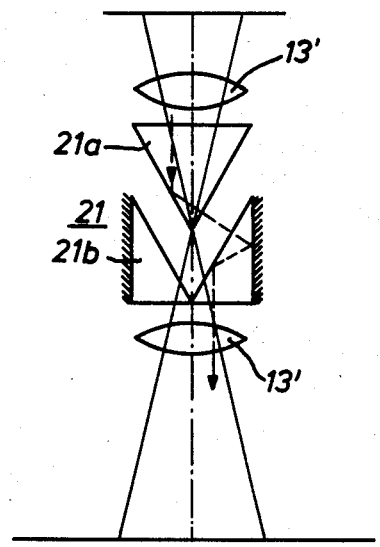
FIG. 2 is a view showing a projection system of the inventive photographic roller copying device with a prism of a different type.

FIG. 2 shows another embodiment of the invention in which only important parts of the objective and prism are shown. The objective 13' includes two lens groups which have a greater distance than the objective of FIG. 1. The length of the lenses in the direction of the beam course is constantly influenced by the construction of the objective so that a space between them can be provided in which a predominantly parallel beam course takes place. For such a predominantly parallel beam course, an especially suitable prism 21 in accordance with Raentsch is used, which is composed of two parts 21a and 21b. The upper part 21a has the shape of an equal-sided prism. The lower part 21b is composed of two prisms with outer reflecting sides which are called half-roots and connected with their tips with one another.

The beam course through such a prism is shown by a broken line and shows that because of the uneven number of reflections a laterally reversed image is produced. Similarly to the prism 14 of FIG. 1, for obtaining a side-accurate copies a turning of the film is required in such a manner that the emulsion or layer side faces toward the light source 9 and the image is thereby projected onto the layer carrier.

Also with this shape of the objective 13 and the prism 21, in the position with the plane of the beam through the prism parallel to the film transporting direction, no rotation takes place. With a position of the prism turned by 45°, turning of the image by 90° takes place.

An important advantage of the inventive arrangement is that the number of the mirrors for both types of the projection is the same so that for turned and not turned images no changes in the optical path length and the irradiation of the original is required and no adjustment of the objective to different conditions with prism or without prism in the beam course is required.

Instead of the above-mentioned prisms also other prisms can be used, such as prisms in accordance with Abbe or Koenig. The arrangement can also be used in principle for roller copying devices with several rigid exchangeable objectives of different focal lengths.

It will be understood that each of the elements described above, or two or more together, may also find a useful application in other types of constructions differing from the types described above.

While the invention has been illustrated and described as embodied in a photographic roller copying device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A photographic roller copying device for projecting of originals having different side lengths on a band-shaped copying material with a band width corresponding to a desired copy dimension, wherein the originals are arranged in a band form and have different formats arranged along and transverse to the longitudinal direction of the band, the photographic roller copying device comprising a projecting objective with an adjustable projecting scale allowing a copying size of both original formats; and a turning prism located in a beam course and turnable between a first angular position in which it turns the image of the original by 90° and a second angular position in which it turns the image of the original by 0° or 180°.

2. A roller copying device as defined in claim 1, wherein said turning prism is a prism in accordance with Schmidt/Pechan.

3. A roller copying device as defined in claim 1, wherein said turning prism is a penta prism with half root.

4. A roller copying device as defined in claim 1, wherein said prism is a prism in accordance with Abbe/Koenig.

5. A roller copying device as defined in claim 1, wherein said prism is a prism in accordance with Raentsch.

6. A roller copying device as defined in claim 1, wherein said prism has an axis which normal to a beam direction has no rotation in said first position relative to a longitudinal axis of a first of said original formats, and its axis in said second position is rotated by 45° to a longitudinal axis of a second transversely located original format.

7. A roller copying device as defined in claim 1, wherein said objective has a plurality of members, said prism being formed as prism in accordance with Raentsch and arranged rotatable between said members of said objective in the region of a parallel beam course.

* * * * *